US012159523B2

(12) United States Patent
Shao et al.

(10) Patent No.: US 12,159,523 B2
(45) **Date of Patent: *Dec. 3, 2024**

(54) METHOD FOR EARLY WARNING SMART GAS HARMFUL COMPONENTS, INTERNET OF THINGS SYSTEM, AND MEDIUM THEREOF

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Lei Zhang, Chengdu (CN); Yong Li, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,904

(22) Filed: Jul. 31, 2023

(65) Prior Publication Data

US 2023/0377439 A1 Nov. 23, 2023

Related U.S. Application Data

(63) Continuation of application No. 18/151,457, filed on Jan. 8, 2023, now Pat. No. 11,810,440.

(30) Foreign Application Priority Data

Nov. 30, 2022 (CN) ......................... 202211514078.6

(51) Int. Cl.

| | |
|---|---|
| ***G08B 21/16*** | (2006.01) |
| ***G08B 1/08*** | (2006.01) |
| ***G08C 17/00*** | (2006.01) |

(52) U.S. Cl.

CPC ............... *G08B 21/16* (2013.01); *G08B 1/08* (2013.01); *G08C 17/00* (2013.01); *G08C 2200/00* (2013.01)

(58) Field of Classification Search

CPC ..... G08B 21/16; G08C 17/00; G08C 2200/00

See application file for complete search history.

(56) References Cited

U.S. PATENT DOCUMENTS

| | | | |
|---|---|---|---|
| 5,249,954 | A | 10/1993 | Allen et al. |
| 2009/0060260 | A1 | 3/2009 | Hou |
| 2020/0386404 | A1 | 12/2020 | Kraus et al. |

FOREIGN PATENT DOCUMENTS

| | | | |
|---|---|---|---|
| CN | 103871208 | A | 6/2014 |
| CN | 204358791 | U | 5/2015 |

(Continued)

OTHER PUBLICATIONS

First Office Action in Chinese Application No. 202211514078.6 mailed on Feb. 4, 2023, 17 pages.

(Continued)

*Primary Examiner* — Andrew W Bee

(74) *Attorney, Agent, or Firm* — METIS IP LLC

(57) ABSTRACT

The present disclosure provides a method, an Internet of Things system and medium for early warning smart gas harmful components. The method comprises: obtaining composition information of a gas and use information of a user; determining a first generation rate of the harmful components based on the composition information; determining a second generation rate of the harmful components through a generation rate prediction model based on the composition information and the use information, wherein the generation rate prediction model is a machine learning model and obtained by training, wherein a training sample includes historical use information of the user and historical composition information, and a label includes a second (Continued)

generation rate corresponding to the historical use information of the user and the historical composition information; determining a generation rate of the harmful components based on the first generation rate and the second generation rate; and generating warning information in response to the generation rate of the harmful components being greater than a generation rate threshold.

20 Claims, 6 Drawing Sheets

(56) References Cited

FOREIGN PATENT DOCUMENTS

| | | | | |
|---|---|---|---|---|
| CN | 205388701 | U | | 7/2016 |
| CN | 106941632 | A | | 7/2017 |
| CN | 207050004 | U | | 2/2018 |
| CN | 108961690 | A | | 12/2018 |
| CN | 212460778 | U | | 2/2021 |
| CN | 114440466 | A | | 5/2022 |
| CN | 115209374 | A | * | 10/2022 |
| CN | 115292883 | A | | 11/2022 |
| CN | 218865378 | U | | 4/2023 |
| JP | 2012195017 | A | | 10/2012 |
| JP | 2021128576 | A | | 9/2021 |
| TW | 201516343 | A | | 5/2015 |

OTHER PUBLICATIONS

"Poisonous! Harmful Substances Found in Domestic Natural Gas", Web page <https://www.sohu.com/a/563640773_121119252>, Jul. 4, 2022.

* cited by examiner

600

METHOD FOR EARLY WARNING SMART GAS HARMFUL COMPONENTS, INTERNET OF THINGS SYSTEM, AND MEDIUM THEREOF

CROSS-REFERENCE TO RELATED APPLICATIONS

This application is a continuation of U.S. patent application Ser. No. 18/151,457, filed on Jan. 8, 2023, which claims priority of Chinese Patent Application No. 202211514078.6, filed on Nov. 30, 2022, the contents of which are hereby incorporated by reference to its entirety.

TECHNICAL FIELD

The present disclosure relates to the field of gas safety monitoring, and in particular to method for early warning smart gas harmful components, Internet of Things system, and medium.

BACKGROUND

Natural gas is a multi-component mixture of gas, the main component of which is alkanes including a large amount of methane and a small amount of ethane, propane and butane. In addition, the natural gas also generally includes hydrogen sulfide, carbon dioxide, nitrogen and water gas, as well as trace amounts of inert gases. The main harmful components of the natural gas are hydrogen sulfide and carbon monoxide produced during incomplete combustion. Different levels of volatile organic chemicals contained in gas are toxic and can form secondary pollutants that are harmful to health, such as particulate matter and ozone. In addition, due to the long-term flow of gas in the pipeline, changes in the condition of the pipeline wall and external influences can lead to the entrainment of other harmful components in the gas.

Therefore, there is a need to provide a method and an Internet of Things system for early warning smart gas harmful components to realize the monitoring of the gas harmful components for timely warning of household gas safety and pipeline cleaning to ensure safe gas use.

SUMMARY

One or more embodiments of this present disclosure provide a method for early warning smart gas harmful components. The method is performed by a smart gas safety management platform of a smart gas household safety management Internet of Things system. The method comprises: obtaining composition information of a gas and use information of a user; determining a generation rate of harmful components of the gas based on the composition information and the use information; and generating warning information in response to the generation rate of the harmful components being greater than a generation rate threshold. The determining a generation rate of harmful components of the gas based on the composition information and the use information includes: determining a first generation rate of the harmful components based on the composition information; determining a second generation rate of the harmful components through a generation rate prediction model based on the composition information and the use information, wherein the generation rate prediction model is a machine learning model and obtained by training, wherein a training sample includes historical use information of the user and historical composition information, and a label includes a second generation rate corresponding to the historical use information of the user and the historical composition information; and determining the generation rate of the harmful components based on the first generation rate and the second generation rate.

One of the embodiments of this present disclosure provides an Internet of Things system for early warning smart gas harmful components, the system comprising a smart gas safety management platform, a smart gas user platform, a smart gas service platform, a smart gas household device sensing network platform, and a smart gas household device object platform. The smart gas safety management platform is configured to: obtain composition information of a gas and use information of a user; determine a generation rate of harmful components of the gas based on the composition information and the use information; and generate warning information in response to the generation rate of the harmful components being greater than a generation rate threshold. To determine a generation rate of harmful components of the gas based on the composition information and the use information, the smart gas safety management platform is further configured to: determine a first generation rate of the harmful components based on the composition information; determine a second generation rate of the harmful components through a generation rate prediction model based on the composition information and the use information, wherein the generation rate prediction model is a machine learning model and obtained by training, wherein a training sample includes historical use information of the user and historical composition information, and a label includes a second generation rate corresponding to the historical use information of the user and the historical composition information; and determine the generation rate of the harmful components based on the first generation rate and the second generation rate.

One or more embodiments of this present disclosure provides a non-transitory computer-readable storage medium, comprising a set of instructions, when executed by a processor, the method for early warning smart gas harmful components is implemented.

BRIEF DESCRIPTION OF THE DRAWINGS

This present disclosure will be further illustrated by way of exemplary embodiments, which will be described in detail by way of the accompanying drawings. These embodiments are not limiting, and in these embodiments, the same numbering indicates the same structure, wherein.

DETAILED DESCRIPTION

Figure 1:
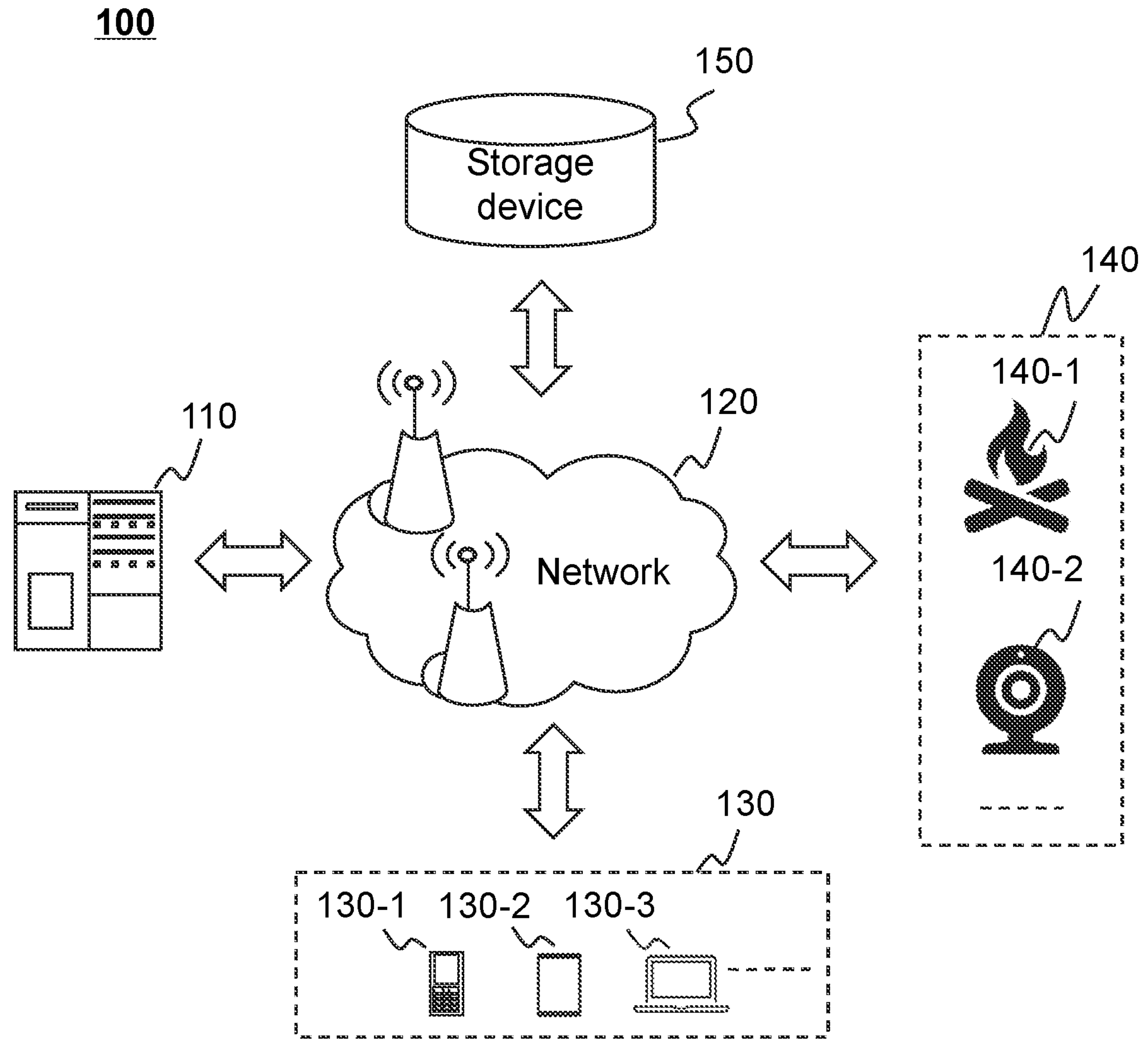
FIG. 1 is a schematic diagram illustrating an application scenario of an Internet of Things system for monitoring smart gas harmful components according to some embodiments of this present disclosure.

The technical solutions of embodiments of the present disclosure will be more clearly described below, and the accompanying drawings needed in the description of the embodiments will be briefly described below. Obviously, the drawings in the following description are merely some examples or embodiments of the present disclosure. For ordinary technicians in the art, the present disclosure may be applied to other similar scenarios according to these accompanying drawings without any creative labor. Unless obviously obtained from the context or the context illustrates otherwise, the same numeral in the drawings refers to the same structure or operation.

It should be understood that the "system", "device", "unit" and/or "module" used herein is a method for distinguishing different components, elements, components, parts or assemblies of different levels. However, if other words may achieve the same purpose, the words may be replaced by other expressions.

As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in present disclosure, specify the presence of stated features, integers, steps, operations, elements, and/or components, but do not preclude the presence or addition of one or more other features, integers, steps, operations, elements, components, and/or groups thereof.

The flowcharts are used in present disclosure to illustrate the operations performed by the system according to the embodiment of the present disclosure. It should be understood that the front or rear operation is not necessarily performed in the order accurately. Instead, the operations may be processed in reverse order or simultaneously. Moreover, one or more other operations may be added to the flowcharts. One or more operations may be removed from the flowcharts.

FIG. 1 is a schematic diagram illustrating an application scenario of an Internet of Things system for monitoring smart gas harmful components according to some embodiments of this present disclosure.

As shown in FIG. 1, the application scenario 100 may include a server 110, a network 120, a terminal device 130, a monitoring device 140, and a storage device 150.

In some embodiments, the application scenario 100 may determine a generation rate of the harmful components by implementing the method for monitoring the smart gas harmful components and/or the Internet of Things system disclosed in this present disclosure. For example, in a typical application scenario, the Internet of Things system for monitoring the smart gas harmful components may obtain composition information of a gas and use information of a user through the monitoring device 140; determine a generation rate of harmful components of the gas based on the composition information and the use information; and generate warning information in response to the generation rate of the harmful components being greater than a generation rate threshold. For more information about the composition information, the use information, and the generation rate of the harmful components, please refer to FIG. 3 and its related description.

The server 110 and the terminal device 130 may be connected via the network 120, and the server 110 may be connected to the storage device 150 via the network 120. The server 110 may include a processing device, and the processing device may be used to perform the method for monitoring the smart gas harmful components as described in some embodiments of this present disclosure. The network 120 may connect the components of the application scenario 100 and/or connect the system to external resource components. The storage device 150 may be used to store data and/or instructions, for example, the storage device 150 may store the composition information, the use information, the generation rate of the harmful components, and the warning information. The storage device 150 may be directly connected to the server 110 or be inside the server 110. The terminal device 130 refers to one or more terminal devices or software. In some embodiments, the terminal device 130 may receive warning information sent by the processing device and present the warning information to the user. Exemplarily, the terminal device 130 may include one or any combination of a mobile device 130-1, a tablet computer 130-2, a laptop computer 130-3, etc., or other devices with input and/or output capabilities. The monitoring device 140 may be used to obtain the composition information of the gas and the use information of the user. The exemplary monitoring device 140 may include a gas device 140-1, a camera 140-2, etc.

It should be noted that application scenario 100 is provided for illustrative purposes only and is not intended to limit the scope of this present disclosure. For a person of ordinary skill in the art, there are a variety of modifications or variations that can be made based on the description of this present disclosure. For example, the application scenario 100 may also include a database. As another example, the application scenario 100 may be implemented on other devices to achieve similar or different capabilities. However, changes and modifications will not depart from the scope of this present disclosure.

The Internet of Things system is an information processing system that includes some or all of the platforms among the user platform, service platform, management platform, sensing network platform, and object platform. The user platform is a functional platform to realize the obtaining of perceptual information of the user and generation of control information. The service platform may realize connecting between the management platform and user platform, and play the function of service communication of perceptual information and service communication of control information. The management platform may realize the coordination of the connection and collaboration among various functional platforms (such as user platform and service platform). The management platform brings together the information of the Internet of Things operation system and may provide sensing management and control management functions for the Internet of Things operation system. The service platform may realize connecting between the management platform and the object platform, and play the function of service communication of perceptual information and service communication of control information. The user platform is a functional platform to realize obtaining of perceptual information of user and generation of control information.

The processing of the information in the Internet of Things system may be divided into the processing process of the perceptual information of user and the processing process of the control information. The control information may be generated based on the perceptual information of user. In some embodiments, the control information may include user demand control information, and the perceptual information of user may include user query information. The process of perceptual information includes obtaining the perceptual information by the object platform and transmitting the perceptual information to the management platform through the sensing network platform. The user demand control information is transmitted from the management platform to the user platform through the service platform, which in turn enables the control of sending prompt information.

Figure 2:
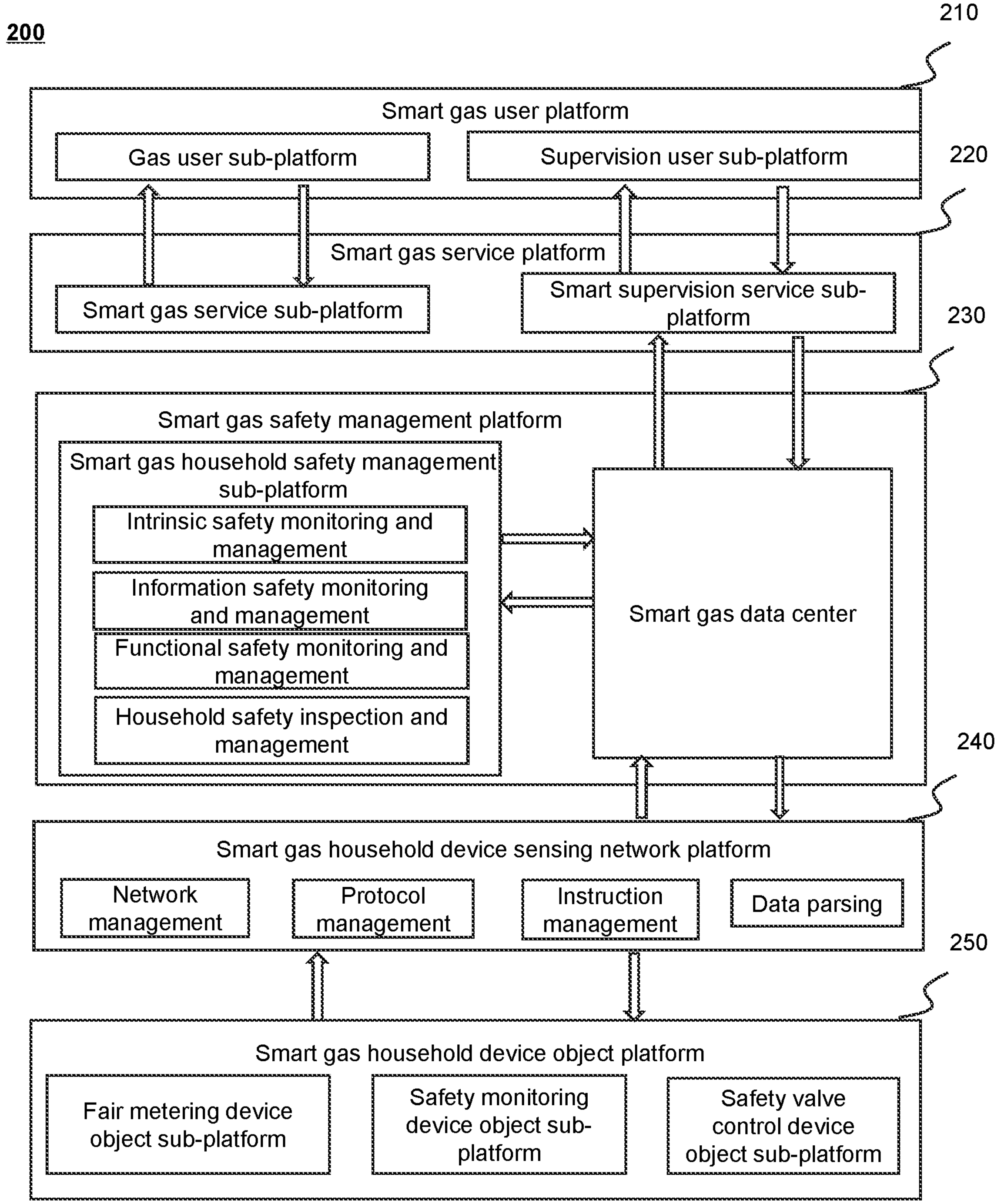
FIG. 2 is an exemplary module diagram illustrating an Internet of Things system for monitoring smart gas harmful components according to some embodiments of this present disclosure.

FIG. 2 is an exemplary module diagram illustrating an Internet of Things system for monitoring smart gas harmful components according to some embodiments of this present disclosure.

As shown in FIG. 2, the Internet of Things system for monitoring smart gas harmful components 200 may include a smart gas user platform 210, a smart gas service platform 220, a smart gas safety management platform 230, a smart gas household device sensing network platform 240, and a smart gas household device object platform 250. In some embodiments, the Internet of Things system for monitoring smart gas harmful components 200 may be part of server or implemented by a server.

In some embodiments, the Internet of Things system for monitoring smart gas harmful components 200 may be applied to multiple scenarios to monitor the harmful components. In some embodiments, the Internet of Things system for monitoring smart gas harmful components 200 may obtain the query instruction based on a query demand for the harmful components of a gas sent by a supervision user, and obtain a query result based on the query instruction. In some embodiments, the Internet of Things system for monitoring smart gas harmful components 200 may obtain composition information of a gas and use information of a user, determine a generation rate of harmful components of the gas based on the composition information and the use information, and generate warning information in response to the generation rate of the harmful components being greater than a generation rate threshold.

The multiple scenarios for the Internet of Things system for monitoring smart gas harmful components 200 may include gas composition monitoring, exhaust gas treatment, etc. It should be noted that the above scenarios are only examples and do not limit the specific application scenarios of the Internet of Things system for monitoring smart gas harmful components 200. A person skilled in the art can apply the Internet of Things system for monitoring smart gas harmful components 200 to any other suitable scenarios based on what is disclosed in this embodiment.

The smart gas user platform 210 may be a user-oriented platform for obtaining user demand as well as feeding information back to the user. In some embodiments, the smart gas user platform 210 may be configured as a terminal device, for example, a mobile phone, computer and other smart devices.

In some embodiments, the smart gas user platform 210 may include a gas user sub-platform and a supervision user sub-platform. The gas user may receive warning information sent by the smart gas service platform 220 through the gas user sub-platform. The supervision user may send a generation rate query instruction of the harmful components of the gas to the smart gas service platform 220 through the supervision user sub-platform. The gas user may be a user of a gas device, and the supervision user may be a manager or a government official who monitors the gas device as well as the gas composition. In some embodiments, the smart gas user platform 210 may obtain instruction input by the user through the terminal device for querying information related to the generation rate of the harmful components of the gas. As another example, the smart gas user platform 210 may provide the user with the information related to the generation rate of the harmful components of the gas as well as the warning information.

The smart gas service platform 220 may be a platform that provides information/data transmission and interaction.

In some embodiments, the smart gas service platform 220 may be used for the interaction of information and/or data between the smart gas safety management platform 230 and the smart gas user platform 210. For example, the smart gas service platform 220 may receive a query instruction from the smart gas user platform 210, store and process the query instruction, then send the query instruction to the smart gas safety management platform 230, and obtain the information related to the generation rate of the harmful components of the gas from the smart gas safety management platform 230, store and process the information, and then send the information to the smart gas user platform 210.

In some embodiments, the smart gas service platform 220 may include a smart gas service sub-platform and a smart supervision service sub-platform. In some embodiments, the smart gas service sub-platform may be used to receive warning information sent by the smart gas safety management platform 230 and send the warning information to the gas user sub-platform. In some embodiments, the smart supervision service sub-platform may be used to receive the query instruction sent by the supervision user sub-platform and send the query instruction to the smart gas safety management platform 230.

The smart gas safety management platform 230 may refer to the Internet of Things platform that integrates and coordinates the connection and collaboration between the functional platforms and provides sensing management and control management.

In some embodiments, the smart gas safety management platform 230 may be used for the processing of information and/or data. For example, the smart gas safety management platform 230 may be used for intrinsic safety monitoring and management, information safety monitoring and management, functional safety monitoring and management, and household safety inspection and management.

In some embodiments, the smart gas safety management platform 230 may also be used for the interaction of information and/or data between the smart gas service platform 220 and the smart gas household device sensing network platform 240. For example, the smart gas safety management platform 230 may receive the query instruction sent by the smart gas service platform 220 (e.g., the smart supervision service sub-platform), store and process the query instruction, and send the query instruction to the smart gas household device sensing network platform 240, as well as obtain the composition information of the gas from the smart gas household device sensing network platform 240, store and process the composition information, and send the composition information to the smart gas service platform 220.

In some embodiments, the smart gas safety management platform 230 may include a smart gas household device management sub-platform and a smart gas data center.

in some embodiments, the smart gas household device management sub-platform may be used to obtain the composition information of the gas and the use information of the user, determine a generation rate of harmful components of the gas based on the composition information and the use information, and generate warning information in response to the generation rate of the harmful components being greater than a generation rate threshold.

In some embodiments, the smart gas network household management sub-platform may further be used to: determine a first generation rate of the harmful components based on the composition information, determine a second generation rate of the harmful components based on the composition information and the use information, and determine the generation rate of the harmful components based on the first generation rate and the second generation rate.

In some embodiments, the smart gas household device management sub-platform may further be used to: determine the second generation rate by a generation rate prediction model based on the composition information and the use information, and the generation rate prediction model is a machine learning model.

In some embodiments, the smart gas household device management sub-platform may further be used to: determine an abnormal rate based on the warning information, and perform safety inspection on a gas pipeline and the gas component in response to the abnormal rate being greater than an abnormal rate threshold.

The smart gas data center may be a data management sub-platform that stores, retrieves, and transfers data. The smart gas data center may store historical data, such as historical use information, historical composition information, etc. The above data may be obtained by manual inputting or execution of the present method. In some embodiments, the smart gas data center may be used to send the warning information to the smart gas service platform 220.

For more information about the smart gas safety management platform 230 please refer to FIG. 3, FIG. 4, FIG. 5, FIG. 6 and their related descriptions.

The smart gas household device sensing network platform 240 may refer to a platform that unifies the management of the sensing communication among the platforms in the Internet of Things system 200. In some embodiments, the smart gas household device sensing network platform 240 may be configured as a communication network and gateway. The smart gas household device sensing network platform 240 may use multiple groups of gateway servers, or multiple groups of smart routers, which are not limited here.

In some embodiments, the smart gas household device sensing network platform 240 may be used for network management, protocol management, instruction management, and data parsing. In some embodiments, the smart gas household device sensing network platform 240 may be used to send the composition information of the gas to the smart gas data center.

The smart gas pipeline network device object platform 250 may be a functional device for monitoring and transmitting the target pipeline segment. In some embodiments, the smart gas pipeline network device object platform 250 may be configured as a monitoring device, for example, a gas stove, a camera, a robot, etc. In some embodiments, the smart gas pipeline network device object platform 250 may send the obtained composition information to the smart gas safety management platform 230 via the smart gas household device sensing network platform 240. In some embodiments, the smart gas pipeline network device object platform 250 may include a fair metering device object sub-platform, a safety monitoring device object sub-platform, and a safety valve control device object sub-platform.

In some embodiments of this present disclosure, through the above system, the opposability between different types of data can be ensured, ensuring the classified transmission and traceability of the data, and the classified issuance and processing of instructions, making the Internet of Things structure and data processing clear and controllable, and facilitating the control and data processing of the Internet of Things.

Figure 3:
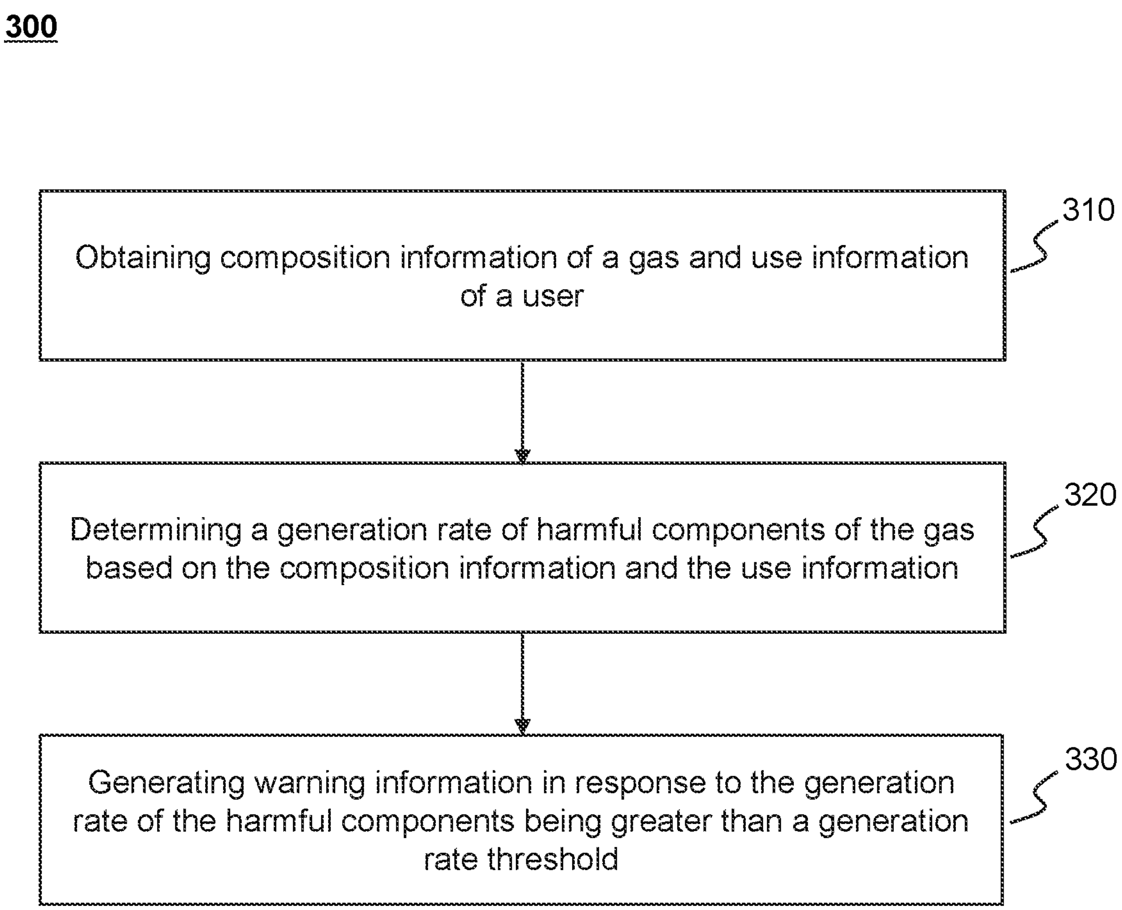
FIG. 3 is an exemplary flowchart illustrating a method for monitoring smart gas harmful components according to some embodiments of the present disclosure.

FIG. 3 is an exemplary flowchart illustrating a method for monitoring smart gas harmful components according to some embodiments of the present disclosure. In some embodiments, the process 300 may be performed by the smart gas safety management platform of the smart gas household safety management Internet of Things system. As shown in FIG. 3, the process 300 includes the following steps.

Step 310, obtaining composition information of a gas and use information of a user.

In some embodiments of this present disclosure, the gas may be a gaseous fuel for residents and industrial business use. The exemplary gas may include a natural gas, liquefied petroleum gas, a coal gas, etc. The composition information may be information related to the various chemical components of the gas. The composition information may include the various chemical components of the gas and their percentages, for example, methane and its percentage, ethane and its percentage, propane and its percentage, nitrogen and its percentage, hydrogen sulfide and its percentage, and carbon monoxide and its percentage in natural gas. When there is abnormal mixing of harmful components in the gas source, the content of the harmful components in the composition information may increase. For example, the content of components such as carbon monoxide and hydrogen sulfide may increase. In some embodiments, the composition information of the gas may be determined by the sensors of the gas device (e.g., the content of sulfur determined by sensors), or a gas supply site, gas management platform, etc., via the network.

The use information may be information related to the process of using the gas by the user. For example, the use information may include the time of using gas, etc.

In some embodiments, the use information of the user may include a firepower size and a flame image. The firepower size may reflect the amount of gas consumed per unit time in the gas device during gas combustion (i.e., corresponding to the gas combustion rate). The firepower size may be expressed as a specific indication of the gas device. For example, the firepower size of the gas stove may be medium, small or large. Different firepower sizes correspond to different gas consumptions. The flame image may be an image of the flame during the gas combustion. The flame image may reflect the amount of gas actually consumed by combustion per unit time. The larger the flame in the flame image is, the larger the amount of gas actually consumed by the combustion is. The firepower size and flame image may be used to determine whether the gas is completely burned or not. For example, when a gas device is used with a large firepower size and the actual flame size in the flame image is small, it may be determined that the gas is not completely burned. In some embodiments, the use information may be determined by the sensor of the gas device.

Step 320, determining a generation rate of harmful components of the gas based on the composition information and the use information.

The harmful components of the gas may include harmful components mixed in the gas before the gas is burned and harmful components produced when the gas is not burned sufficiently, for example, hydrogen sulfide, carbon monoxide, tetrahydrothiophene, acrylate and other components. The generation rate of the harmful components of the gas may be the rate of release of the harmful components of the gas from the gas device to the outside air. In some embodiments, the generation rate of the harmful components of the gas may be determined by mathematical calculations, fitting methods, artificial intelligence, etc. For example, the generation rate of the harmful components of the gas may be determined by theoretical calculations using chemical reaction equations. For more specific information about the determining of the generation rate of the harmful components of the gas, please refer to FIGS. 4 and 5 and their related descriptions.

Step 330, generating warning information in response to the generation rate of the harmful components being greater than a generation rate threshold.

The generation rate threshold may be a critical value at which the harmful components may be harmful to the user and the environment. Trace amounts of the harmful components may be considered negligible or harmless. In some embodiments, the generation rate threshold may be determined by an empirical threshold.

The warning information may be the information that is generated to the user for alerting. The warning information may include any form of information such as voice, text, image, etc. In some embodiments, the warning information may be sent to the user via the terminal device, or the warning information may be sent via a warning component of the gas device (e.g., a speaker with an alarm function). In some embodiments, the warning information may be varied in a targeted manner based on the actual condition of the harmful components. For example, when the carbon monoxide component of the harmful components is greater than the harmful component threshold, the warning information may be warning related to "incomplete gas combustion" in the form of a voice, text, or image. In some embodiments, the warning information may be sent to the user via the smart gas user platform.

The method for monitoring smart gas harmful components described in some embodiments of this present disclosure enables real-time monitoring of gas harmful components, predicting the generation rate of harmful components by various methods, and determining warning information based on the generation rate to avoid harm to the user and the environment from gas harmful components.

Figure 4:
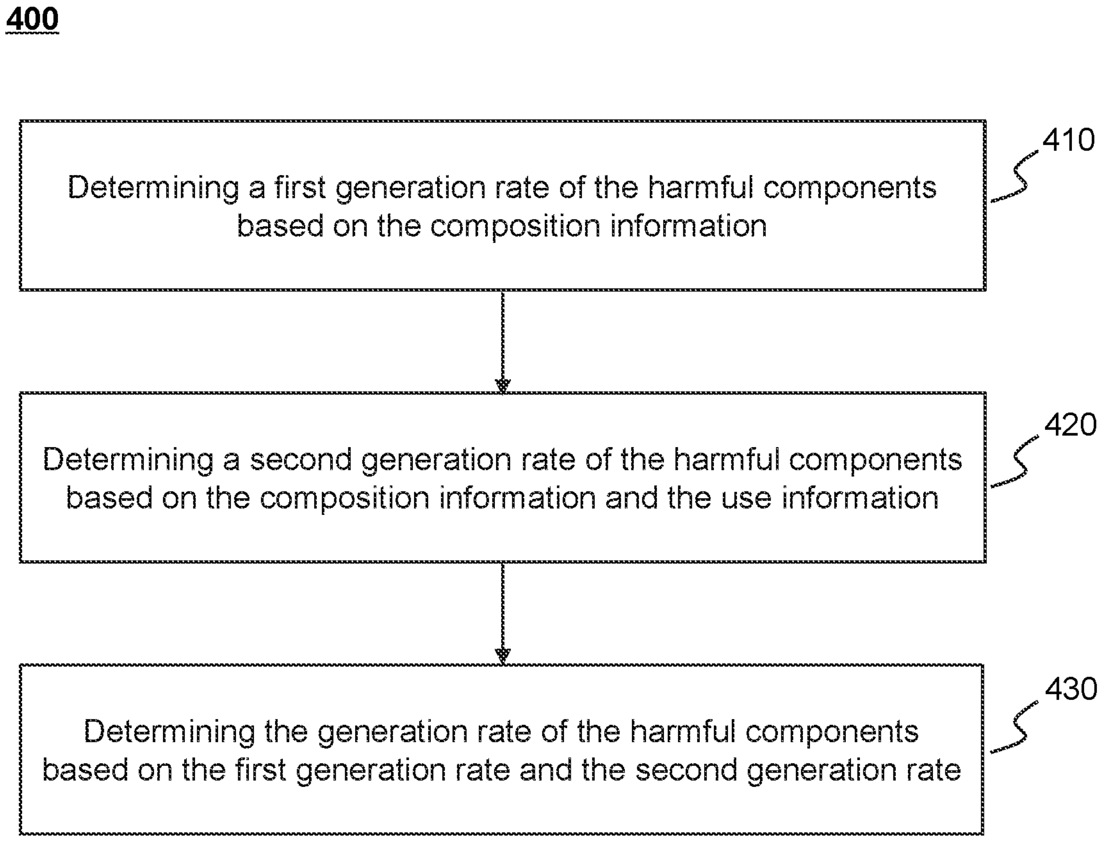
FIG. 4 is an exemplary flowchart illustrating the determining of a generation rate of the harmful components according to some embodiments of the present disclosure.

FIG. 4 is an exemplary flowchart illustrating the determining of a generation rate of the harmful components according to some embodiments of the present disclosure. In some embodiments, the process 400 may be performed by the smart gas safety management platform of the smart gas household safety management Internet of Things system. As shown in FIG. 4, the process 400 includes the following steps.

Step 410, determining a first generation rate of the harmful components based on the composition information.

The first generation rate may be a theoretical value of the generation rate of the harmful components. For example, based on the composition information, the generation rate of the harmful components is determined as the first generation rate by calculating the chemical reaction equation involved in the combustion process.

In some embodiments, the first generation rate is also related to a combustion rate and a combustion adequacy. The combustion rate and the combustion adequacy may be determined based on the use information of user. For example, based on the use information, the combustion and combustion adequacy are determined by a machine learning model. For more information about the determination of the combustion rate and the combustion adequacy, please refer to FIG. 5 and its related description. The exemplary determination process of the first generation rate may include: determining a combustion rate of the gas based on the firepower size of the use information, and determining the first generation rate of the harmful components by calculating the chemical reaction equation based on the combustion rate of the gas, the composition information of the gas and the combustion adequacy. The combustion rate may be the rate of gas consumption. The combustion rate may be expressed as an indicative value of a specific firepower size of the gas device. The combustion adequacy may be the percentage of a gas amount of the gas that is fully combusted to the total gas amount. The combustion adequacy may be determined based on a theoretical value. For example, the combustion adequacy may be 95.5%. For example, the first generation rate of the harmful components produced from incomplete combustion (e.g., carbon monoxide from incomplete combustion of methane) may be determined by calculating according to the chemical equation $7CH_4+12O_2=4CO+3CO_2+14H_2O$, the amount of methane participating in the above reaction may be 4.5% of the total gas amount, and the ratio of the amount of generated carbon monoxide to the time of the combustion process may be used as the first generation rate.

Step 420, determining a second generation rate of the harmful components based on the composition information and the use information.

The second generation rate may be a predicted value of the generation rate of the harmful components. The second generation rate may reflect the generation rate of the harmful components from the current time point to a future time point. In some embodiments, the second generation rate may be determined by artificial intelligence, comparison based on historical data (e.g., historical second generation rate), etc. For example, the second generation rate may be determined by inputting the composition information and the use information to the machine learning model.

In some embodiments, the second generation rate may be determined by a generation rate prediction model. For more information about the specific process of determining the second generation rate, please refer to FIG. 5 and its related description.

Step 430, determining the generation rate of the harmful components based on the first generation rate and the second generation rate.

In some embodiments, the generation rate of the harmful components may be determined by mathematical calculations of the first generation rate and the second generation rate, for example, averaging the first generation rate and the second generation rate, etc.

In some embodiments of this disclosure, the generation rate of the harmful components is determined separately by theoretical calculations and intelligent predictions, and the determined results are fused to improve the matching degree between the results and the actual combustion situation.

Figure 5:
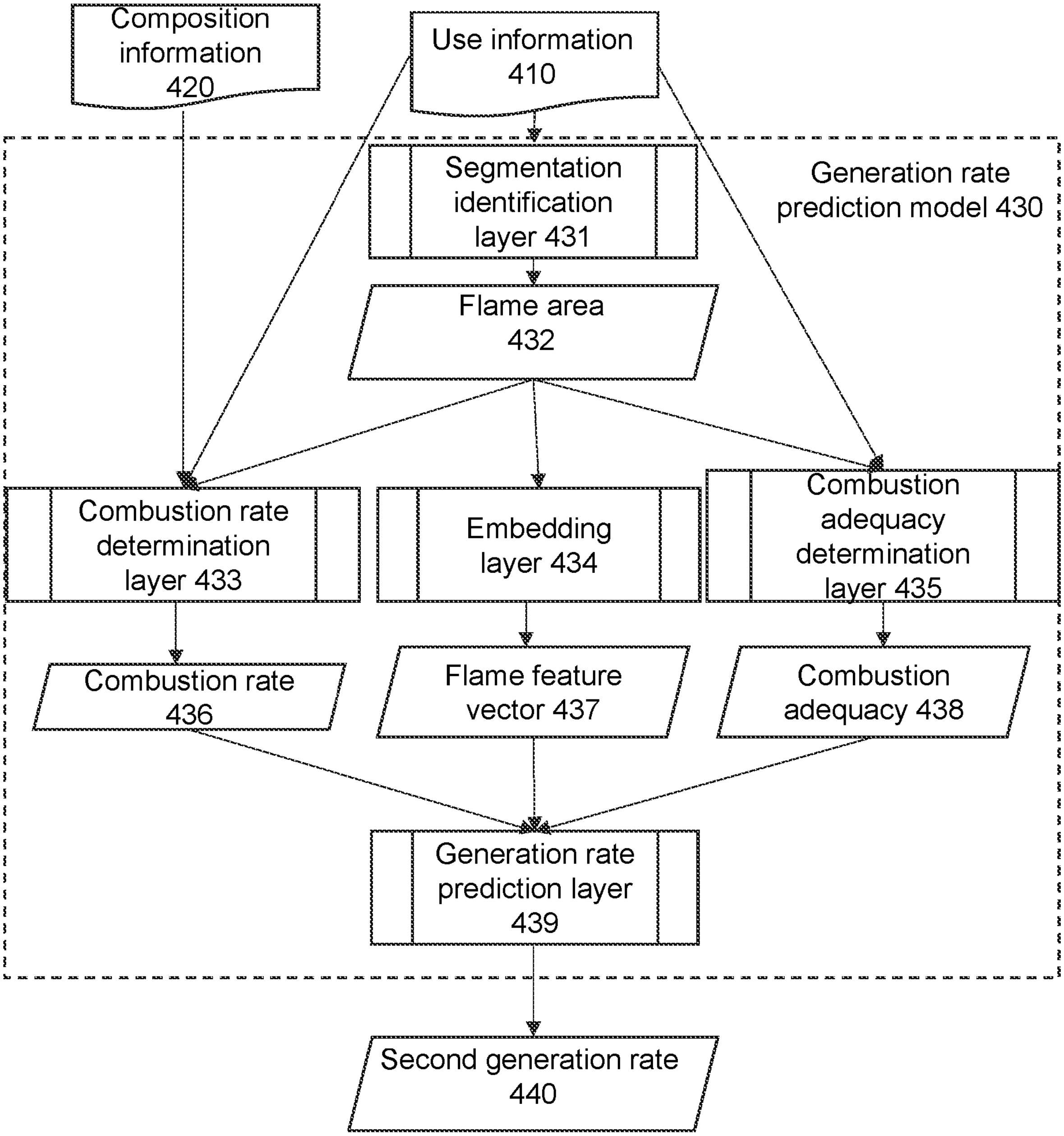
FIG. 5 is a schematic diagram illustrating the structure of a generation rate prediction model according to some embodiments of this present disclosure.

FIG. 5 is a schematic diagram illustrating the structure of a generation rate prediction model according to some embodiments of this present disclosure.

In some embodiments, the smart gas safety management platform may determine a second generation rate based on the composition information and the use information through a generation rate prediction model. The generation rate prediction model may be a machine learning model. The use information may be a flame image. As shown in FIG. 5, an input of the generation rate prediction model 430 may include use information 410 and composition information 420, and an output of the generation rate prediction model 430 may include a second generation rate 440.

In some embodiments, the generation rate prediction model 430 may be obtained by training a large number of training samples with labels. Specifically, multiple groups of training samples with labels are input to the initial generation rate prediction model, a loss function is constructed based on the output of the initial generation rate prediction model and the labels, and the parameters of the initial generation rate prediction model are updated by training based on iterations of the loss function. In some embodiments, the training may be performed by various methods based on the training samples. For example, the training may be performed based on a gradient descent method. When the preset condition is met, the training is finished and the trained generation rate prediction model is obtained. The preset condition may be convergence of the loss function. In some embodiments, the training samples may include historical use information of the user and historical composition information. The historical use information of the user may include a historical flame image. The labels may be corresponding second generation rate. The training samples may be determined by retrieving historical information stored in the smart gas data center (storage device). The labels may be obtained by manual annotation.

In some embodiments, the generation rate prediction model 430 may include a segmentation identification layer 431, an embedding layer 434, and a generation rate prediction layer 439. The segmentation identification layer 431 may be used to determine a flame area 432 based on the use information 410. For example, the flame area 432 is determined based on the flame image in the use information 410. The flame area 432 may be the area in the flame image where the flame is located, for example, the flame area 432 may be the image area that includes the flame center, the inner flame, and the outer flame in the flame image. The embedding layer 434 may be used to determine a flame feature vector 437 based on the flame area 432. The flame feature vector 437 may be a feature vector that reflects the flame features. The flame feature vector may include elements such as flame color, flame temperature, flame brightness, and the presence of smoke. An exemplary flame feature vector may be $\vec{l}$=(yellow, 600° C., no smoke). The generation rate prediction layer 439 may be used to determine a second generation rate 440 based on the flame feature vector 437.

In some embodiments, an output of the segmentation recognition layer 431 may be used as an input of the embedding layer 434. An output of the embedding layer 434 may be used as an input of the generation rate prediction layer 439. The segmentation identification layer 431, the embedding layer 434, and the generation rate prediction layer 439 may be obtained by joint training. For example, the training samples with labels are input into the initial segmentation identification layer to output a flame area, the flame area is input into the initial embedding layer to output a flame feature vector, and the flame feature vector is input into the generation rate prediction layer to output a second generation rate. The loss function is constructed based on the labels and the outputted second generation rate, and the initial segmentation identification layer, the initial embedding layer, and the initial generation rate prediction layer are updated simultaneously to obtain the trained segmentation identification layer 431, the trained embedding layer 434, and the trained generation rate prediction layer 439. The training samples may include historical use information, the corresponding historical flame area, and the corresponding historical flame feature vector. The labels may be the corresponding second generation rate of the harmful components. The labels may be determined by manual annotation.

In some embodiments, the generation rate prediction model 430 may also include a combustion rate determination layer 433 and a combustion adequacy determination layer 435. The combustion rate determination layer 433 may be used to determine the combustion rate 436 based on the flame area 432, the composition information 420, and the use information 410. For example, the combustion rate 436 is determined based on the flame area 432, the composition information 420, and the firepower size in the use information 410. The combustion adequacy determination layer 435 may be used to determine combustion adequacy 438 based on the flame area 432. In some embodiments, an input of the combustion adequacy determination layer 435 may also include the use information 410. For example, the combustion adequacy 438 is determined based on the firepower size, flame image, and flame area 432 in the use information 410. The combustion rate 436 and the combustion adequacy 438 are input to the generation rate prediction layer 439 together with the flame feature vector 437 to output the second generation rate 440.

In some embodiments, the combustion rate determination layer 433 and the combustion adequacy determination layer 435 may be obtained by joint training with the segmentation identification layer 431, the embedding layer 434, and the generation rate prediction layer 439. For example, the training samples with labels are input into the initial segmentation identification layer to output a flame area, the flame area is input into the initial combustion rate determination layer to output a combustion rate, and the combustion rate is input into the generation rate prediction layer to output a second generation rate. The loss function is constructed based on the labels and the outputted second generation rate, and the initial segmentation identification layer, the initial combustion rate determination layer, and the initial generation rate prediction layer are updated simultaneously to obtain the trained segmentation identification layer 431, the trained combustion rate determination layer 433, and the trained generation rate prediction layer 439. The training samples may include historical use information, corresponding historical flame area, corresponding historical combustion rate, corresponding historical combustion adequacy, and corresponding historical flame feature vector. The labels may be the corresponding second generation rate of the harmful components. The labels may be determined by manual annotation. The training of the combustion adequacy determination layer 435 is described in the training process of the combustion rate determination layer 433 and not repeated here.

By introducing the combustion rate 436 and combustion adequacy 438 in the input of the generation rate prediction layer 439, the generation of the harmful components during the incomplete combustion of the combustion process can be taken into account comprehensively, and the matching degree of the predicted generation rate with the actual situation can be improved.

The generation rate prediction model described in some embodiments of this present disclosure enables the prediction of generation rate of the harmful components in the future and provides a reference for the determination of the final generation rate of the harmful components. In addition, the analysis of the flame area in the flame image by the model to determine the combustion adequacy of the combustion process can introduce the harmful components generated when the gas is not fully combusted and improve the accuracy of the generation rate of the harmful components.

Figure 6:
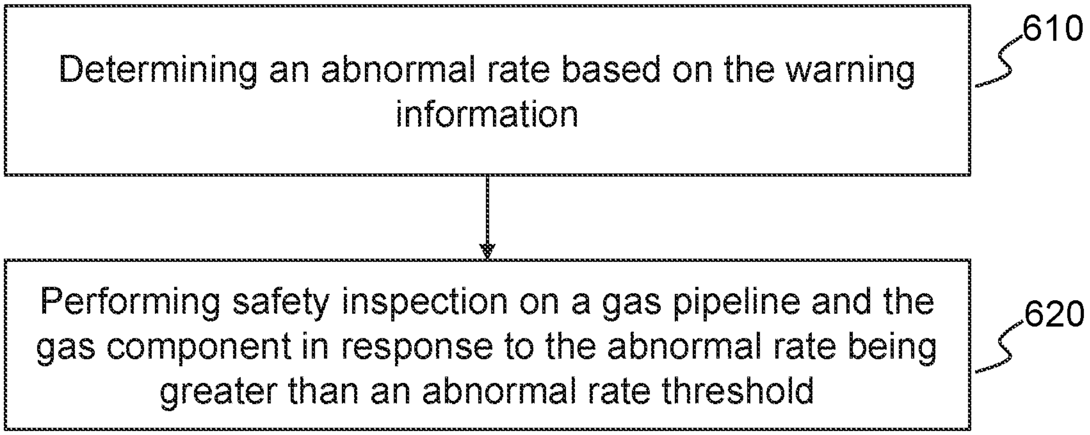
FIG. 6 is an exemplary flowchart illustrating the determining of an abnormal rate according to some embodiments of the present disclosure.

FIG. 6 is an exemplary flowchart illustrating the determining of an abnormal rate according to some embodiments of the present disclosure. In some embodiments, the process 600 may be performed by the smart gas safety management platform of the smart gas household safety management Internet of Things system. As shown in FIG. 6, the process 600 includes the following steps.

Step 610, determining an abnormal rate based on the warning information.

The abnormal rate may represent the probability of abnormality occurrence during the process of gas combustion. Multiple gas devices (e.g., multiple gas stoves) may achieve gas transmission through at least one pipeline. When the multiple gas devices generate the warning information, at least one of the at least one pipeline, the gas composition, and the environment in which the gas devices are used may be abnormal. In some embodiments, the abnormal rate may be a ratio between the number of gas devices that generate warning information and the total number of gas devices. For example, the abnormal rate may be the ratio of the number of gas devices that send warning information among the multiple gas devices.

In some embodiments, the abnormal rate is also correlated to the combustion adequacy. For example, when the harmful component carbon monoxide of the multiple gas devices is greater than the harmful component threshold, it is indicated that the multiple gas devices are involved in inadequate combustion. At this time, the abnormal rate of the pipelines associated with the multiple gas devices may be 100%. The combustion adequacy may be determined by the combustion adequacy determination layer described above.

Step 620, performing safety inspection on a gas pipeline and the gas component in response to the abnormal rate being greater than an abnormal rate threshold.

In some embodiments, the abnormal rate threshold may be determined by an empirical threshold.

In some embodiments, the above safety inspection may include, but is not limited to, troubleshooting the source of harmful components, checking whether the pipeline leaks or has abnormal access, checking whether the exhaust port of gas device is blocked, etc. In some embodiments, the smart gas household device object platform may perform safety inspection on gas device, pipeline, and the gas. For example, the safety inspection device object sub-platform of the smart gas household device object platform may perform air pressure monitoring on pipelines.

In some embodiments, the smart gas safety management platform may determine a target for prioritizing safety inspection based on the difference between the first generation rate and the second generation rate. For example, when the difference between the first generation rate and the second generation rate corresponding to a gas device is greater than the difference threshold, it is indicated that a difference between the theoretical value of combustion and the actual situation reflected by the actual flame image is large. At this time, the safety inspection of the pipeline or pipeline segment corresponding to the gas device may be prioritized. The difference threshold may be determined by manual setting.

In some embodiments, the determination of the target for prioritizing safety inspection is also related to the combustion adequacy. When the combustion adequacy of a gas device is low, it indicates that there is a safety hazard for the gas device or the environment in which the gas device is located. For example, the gas pipeline of the gas device is blocked, the environment ventilation is poor, etc. In this case, the warning information may be generated in a targeted manner and sent to the user.

By determining the abnormal rate in some embodiments of this present disclosure, the warning information of multiple gas devices may be analyzed to determine whether the gas pipeline is abnormal from the use side of the gas (i.e., the gas device), providing a new idea for multi-angle gas risk troubleshooting while improving the comprehensiveness of gas safety inspection.

This present disclosure provides a non-transitory computer-readable storage medium comprising a set of instructions, when executed by a processor, the method for monitoring smart gas harmful components is implemented.

The basic concepts have been described above. Apparently, for those skilled in the art, the described above is only an example and does not constitute a limitation of the disclosure. Although there is no clear explanation here, those skilled in the art may make various modifications, improvements, and modifications of present disclosure. This type of modification, improvement, and corrections are recommended in present disclosure, so the modification, improvement, and the amendment remains in the spirit and scope of the exemplary embodiment of the present disclosure.

At the same time, present disclosure uses specific words to describe the embodiments of the present disclosure. As "one embodiment", "an embodiment", and/or "some embodiments" means a certain feature, structure, or characteristic of at least one embodiment of the present disclosure. Therefore, it is emphasized and appreciated that two or more references to "an embodiment" or "one embodiment" or "an alternative embodiment" in various parts of present disclosure are not necessarily all referring to the same embodiment. Further, certain features, structures, or features of one or more embodiments of the present disclosure may be combined.

Moreover, unless the claims are clearly stated, the sequence of the present disclosure, the use of the digital letters, or the use of other names is not configured to define the order of the present disclosure processes and methods. Although some examples of the disclosure currently considered useful in the present disclosure are discussed in the above disclosure, it should be understood that the details of this class will only be described, and the appended claims are not limited to the disclosure embodiments. The claims are designed to cover all modifications and equivalent combinations consistent with the substance and range of the present disclosure. For example, although the system components described above may be implemented through a hardware device, it may also be implemented through a software only, e.g., the described system installed on an existing server or mobile device.

Similarly, it should be noted that in order to simplify the expression disclosed in the present disclosure and help the understanding of one or more embodiments of the present disclosure, in the previous description of the embodiments of the present disclosure, a variety of features are sometimes combined into one embodiment, drawings or description thereof. However, this disclosure method does not mean that the characteristics required by the object of the present disclosure are more than the characteristics mentioned in the claims. Rather, claimed subject matter may lie in less than all features of a single foregoing disclosed embodiment.

In some embodiments, numbers expressing quantities of ingredients, properties, and so forth are used. It should be understood that such numbers used for the description of the embodiments are modified by the modifiers "about", "approximately" or "substantially" in some examples. Unless otherwise stated, "about", "approximately" or "substantially" indicates that the number is allowed to vary by ±20%. Accordingly, in some embodiments, the numerical parameters used in the specification and claims are approximate values, and the approximate values may be changed according to characteristics required by individual embodiments. In some embodiments, the numerical parameters should be construed in light of the number of reported significant digits and by applying ordinary rounding techniques. Although the numerical domains and parameters used to confirm its range breadth in some embodiments of the present disclosure are approximate values, in the specific embodiment, such values are set as accurately as possible within the feasible range.

For each patent, patent application, patent application publication and other materials referenced by the present disclosure, such as articles, books, instructions, publications, documentation, etc., all the contents are hereby incorporated by reference. Except for the application history documents that are inconsistent with or conflict with the contents of the present disclosure, the documents that limit the widest range of claims in the present disclosure (currently or later attached to the present disclosure) is also excluded. It should be noted that if a description, definition, and/or terms in the subsequent material of the present disclosure are inconsistent or conflicted with the content described in the present disclosure, the description, definition, and/or terms in this disclosure shall prevail.

Finally, it should be understood that the embodiments described herein are only configured to illustrate the principles of the embodiments of the present disclosure. Other deformations may also belong to the scope of the present disclosure. Thus, as an example, but not limited, the alternative configuration of embodiments of the present disclosure may be consistent with the teachings of the present disclosure. Accordingly, the embodiments of the present disclosure are not limited to the explicitly introduced and described embodiments of the present disclosure.

What is claimed is:

1. A method for early warning smart gas harmful components, wherein the method is performed by a smart gas safety management platform of a smart gas household safety management Internet of Things system, and the method comprises:

obtaining composition information of a gas and use information of a user;

determining a generation rate of harmful components of the gas based on the composition information and the use information; and generating warning information in response to the generation rate of the harmful components being greater than a generation rate threshold;

wherein the determining a generation rate of harmful components of the gas based on the composition information and the use information includes:

determining a first generation rate of the harmful components based on the composition information;

determining a second generation rate of the harmful components through a generation rate prediction model based on the composition information and the use information, wherein the generation rate prediction model is a machine learning model and obtained by training, wherein a training sample includes historical use information of the user and historical composition information, and a label includes a second generation rate corresponding to the historical use information of the user and the historical composition information; and determining the generation rate of the harmful components based on the first generation rate and the second generation rate.

2. The method of claim 1, wherein the smart gas household safety management Internet of Things system further comprises a smart gas user platform, and a smart gas service platform; and the method further comprises:

sending the warning information to the smart gas service platform, and sending the warning information to the smart gas user platform based on the smart gas service platform, and the smart gas user platform being used to query the warning information by the user.

3. The method of claim 2, wherein the smart gas user platform comprises a gas user sub-platform and a supervision user sub-platform; the smart gas service platform includes a smart gas service sub-platform and a smart supervision service sub-platform; the smart gas safety management platform includes a smart gas household safety management sub-platform and a smart gas data center; and a smart gas household device object platform includes a fair metering device object sub-platform, a safety monitoring device object sub-platform, and a safety valve control device object sub-platform.

4. The method of claim 1, wherein the use information of the user comprises a firepower size and a flame image.

5. The method of claim 1, wherein the first generation rate is further related to a combustion rate and a combustion adequacy, and the combustion rate and the combustion adequacy are determined based on the use information of the user.

6. The method of claim 1, wherein the generation rate prediction model comprises a segmentation identification layer, an embedding layer, and a generation rate prediction layer, wherein the segmentation identification layer is used to determine a flame area based on the use information, the embedding layer is used to determine a flame feature vector based on the flame area, and the generation rate prediction layer is used to determine the second generation rate based on the flame feature vector.

7. The method of claim 6, wherein the generation rate prediction model further comprises a combustion rate determination layer and a combustion adequacy determination layer, wherein the combustion rate determination layer is used to determine a combustion rate based on the flame area, the composition information, and the use information, and the combustion adequacy determination layer is used to determine a combustion adequacy based on the flame area, and the combustion rate and the combustion adequacy are used as an input of the generation rate prediction layer.

8. The method of claim 1, wherein the method further comprises:

determining an abnormal rate based on the warning information; and performing safety inspection on a gas pipeline and the gas components in response to the abnormal rate being greater than an abnormal rate threshold.

9. The method of claim 8, wherein the method further comprises:

determining the abnormal rate based on the warning information and a combustion adequacy of the gas.

10. The method of claim 8, wherein the method further comprises:

determining a target prioritized for safety inspection based on a difference between the first generation rate and the second generation rate.

11. The method of claim 10, wherein the method further comprises:

determining the target for prioritizing safety inspection based on the combustion adequacy of the gas.

12. An Internet of Things system for early warning smart gas harmful components, the system comprising a smart gas safety management platform, a smart gas user platform, a smart gas service platform, a smart gas household device sensing network platform, and a smart gas household device object platform, wherein the smart gas safety management platform is configured to:

obtain composition information of a gas and use information of a user;

determine a generation rate of harmful components of the gas based on the composition information and the use information; and generate warning information in response to the generation rate of the harmful components being greater than a generation rate threshold;

wherein to determine a generation rate of harmful components of the gas based on the composition information and the use information, the smart gas safety management platform is further configured to:

determine a first generation rate of the harmful components based on the composition information;

determine a second generation rate of the harmful components through a generation rate prediction model based on the composition information and the use information, wherein the generation rate prediction model is a machine learning model and obtained by training, wherein a training sample includes historical use information of the user and historical composition information, and a label includes a second generation rate corresponding to the historical use information of the user and the historical composition information; and determine the generation rate of the harmful components based on the first generation rate and the second generation rate.

13. The system of claim 12, wherein the smart gas user platform comprises a gas user sub-platform and a supervision user sub-platform; the smart gas service platform includes a smart gas service sub-platform and a smart supervision service sub-platform; the smart gas safety management platform includes a smart gas household safety management sub-platform and a smart gas data center; and the smart gas household device object platform includes a fair metering device object sub-platform, a safety monitoring device object sub-platform, and a safety valve control device object sub-platform.

14. The system of claim 12, wherein the use information of the user comprises a firepower size and a flame image.

15. The system of claim 12, wherein the first generation rate is further related to a combustion rate and a combustion adequacy, and the combustion rate and the combustion adequacy are determined based on the use information of the user.

16. The system of claim 12, wherein the generation rate prediction model comprises a segmentation identification layer, an embedding layer, and a generation rate prediction layer, wherein the segmentation identification layer is used to determine a flame area based on the use information, the embedding layer is used to determine a flame feature vector based on the flame area, and the generation rate prediction layer is used to determine the second generation rate based on the flame feature vector.

17. The system of claim 16, wherein the generation rate prediction model further comprises a combustion rate determination layer and a combustion adequacy determination layer, wherein the combustion rate determination layer is used to determine a combustion rate based on the flame area, the composition information, and the use information, and the combustion adequacy determination layer is used to determine a combustion adequacy based on the flame area, and the combustion rate and the combustion adequacy are used as an input of the generation rate prediction layer.

18. The system of claim 12, wherein the smart gas safety management platform is further configured to:

determine an abnormal rate based on the warning information; and perform safety inspection on a gas pipeline and the gas components in response to the abnormal rate being greater than an abnormal rate threshold.

19. The system of claim 18, wherein the smart gas safety management platform is further configured to:

determine a target prioritized for safety inspection based on a difference between the first generation rate and the second generation rate.

20. A non-transitory computer-readable storage medium, comprising a set of instructions, wherein when executed by a processor, the method of claim 1 is implemented.

* * * * *